Oct. 24, 1950  H. GAIBEL  2,526,650
THERMOPLASTIC SEVERING AND FUSING MACHINE
Filed May 22, 1947  2 Sheets-Sheet 1
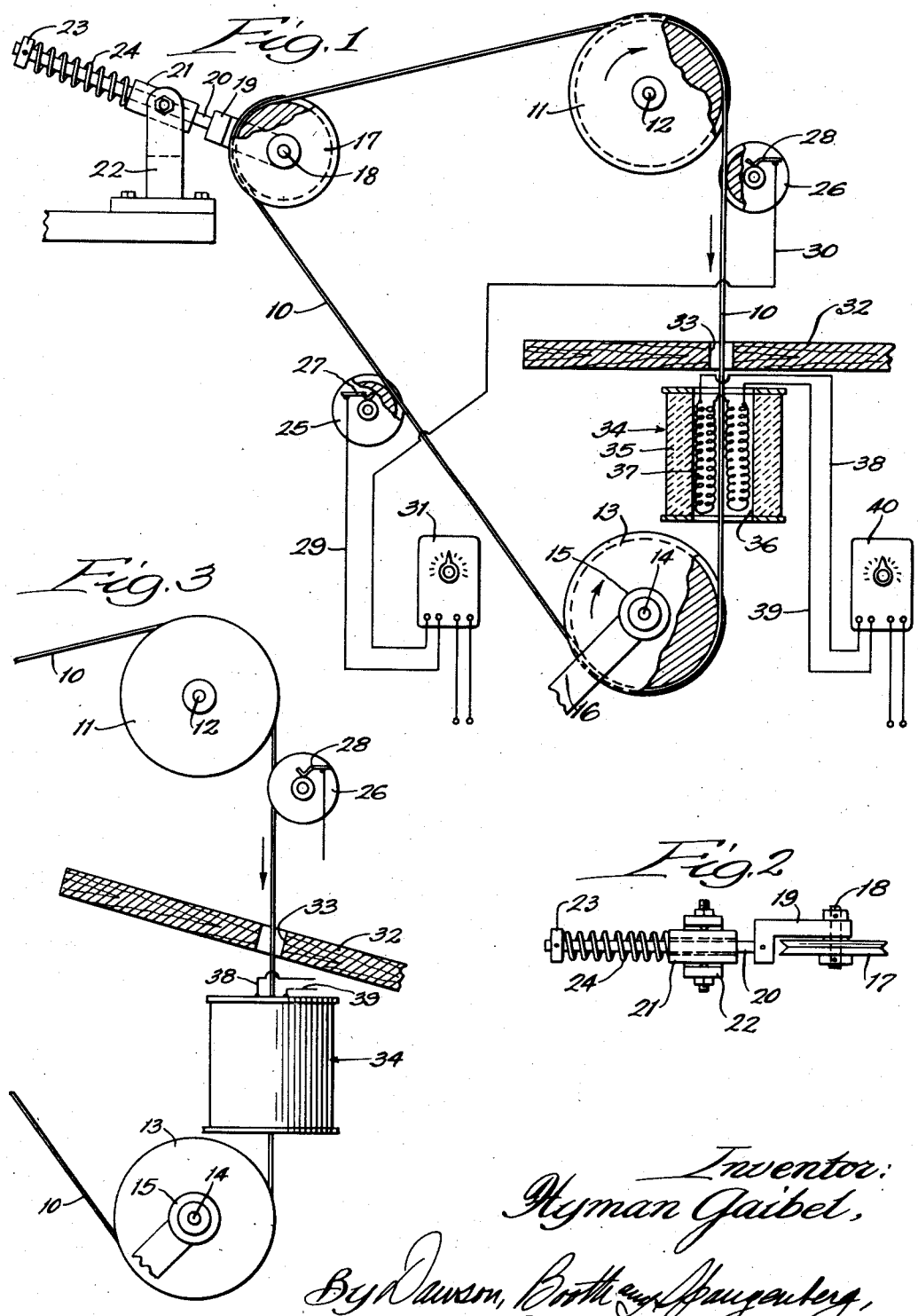
Inventor:
Hyman Gaibel,
By Dawson, Booth and Spangenberg,
Attorneys.

Oct. 24, 1950        H. GAIBEL        2,526,650
THERMOPLASTIC SEVERING AND FUSING MACHINE
Filed May 22, 1947        2 Sheets-Sheet 2
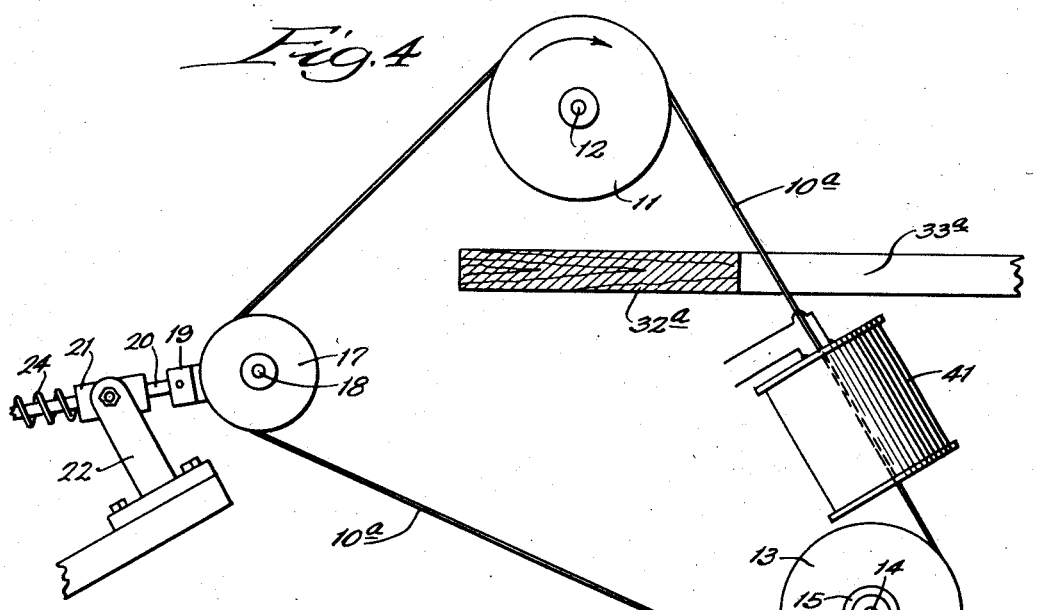
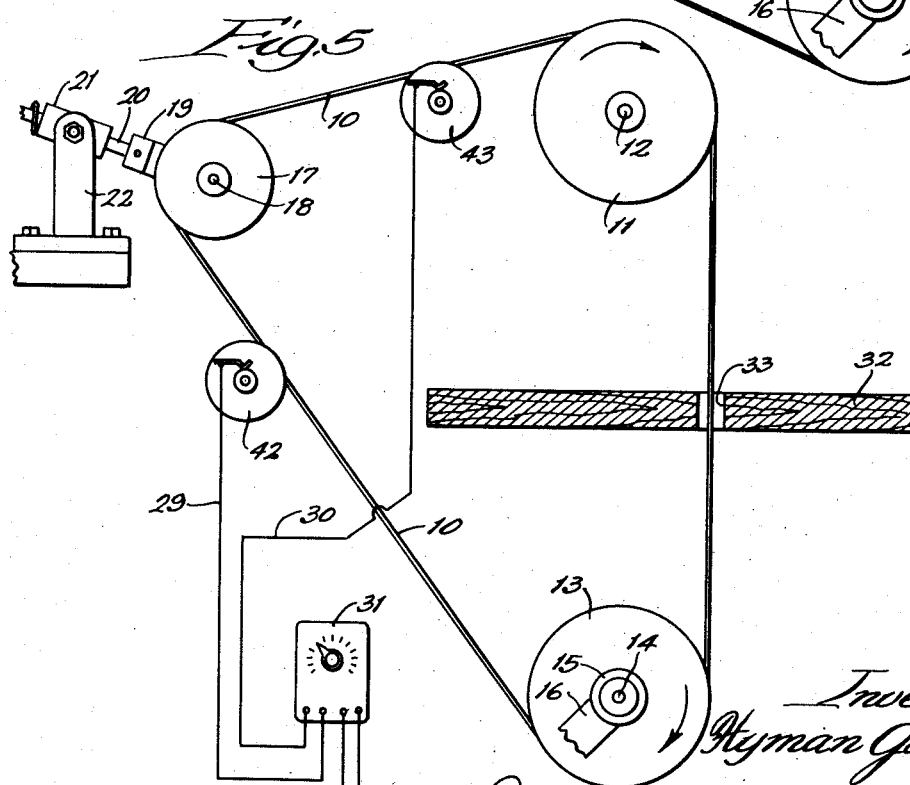

Patented Oct. 24, 1950

2,526,650

UNITED STATES PATENT OFFICE 2,526,650

THERMOPLASTIC SEVERING AND FUSING MACHINE

Hyman Gaibel, Chicago, Ill.

Application May 22, 1947, Serial No. 749,800

8 Claims. (Cl. 219—19)

This invention relates to a thermoplastic severing and fusing machine and method. The invention is particularly useful in the severing and fusing of thermoplastic materials in substantially all forms, including thermoplastic fabric, piled material, webs, filaments, etc. The present invention constitutes a continuation-in-part of my co-pending application Serial No. 709,499 for Preparation of Piled Webs.

An object of the invention is to provide a machine and method for effective and continuous severing or fusing operations with respect to thermoplastic materials. Another object is to provide mechanism which may be operated for great periods of time while effectively severing thermoplastic material in substantially all forms and arrangements, while also fusing end portions or other portions of thermoplastic materials. A further object is to provide a method for severing and fusing thermoplastic materials while maintaining the severing or fusing element substantially free of adhering plastic material. A still further object is to provide new and simplified apparatus which is highly effective in achieving severing and fusing operations with respect to thermoplastic materials. Other specific objects and advantages will appear as the specification proceeds.

The invention is illustrated, in selected embodiments, by the accompanying drawings, in which—

Figure 1 is a side view in elevation of apparatus embodying my invention, a portion of the apparatus being shown in section; Fig. 2, a top plan view of the take-up mechanism employed; Fig. 3, a broken side view in elevation of a structure such as is shown in Fig. 1 but in which the table support is tilted; Fig. 4, a side view in elevation of a modified structure embodying my invention, a portion of the slotted table being shown in section; and Fig. 5, a view similar to Fig. 1 but showing the contact disks for supplying current to the severing element arranged in a different relative position.

In the illustration given in Figs. 1 and 2, 10 designates a severing or fusing element which may be formed of any suitable metal or material. If desired, heat may be applied to the element 10 by any means so as to raise it to a severing or fusing temperature. In the specific illustration given in Figs. 1 and 2, the element 10 is formed of nichrome wire or any other well-known electric-resistance material. The wire may be of any cross-sectional shape, as, for example, square, rectangular, round, etc. A round wire is particularly useful in the arrangement shown in that it retains its position effectively upon V-grooved wheels.

The element 10 is supported upon three grooved wheels. The upper wheel 11 is mounted upon shaft 12 and is an idler wheel. The lower wheel 13 is mounted upon shaft 14 and is equipped with a pulley 15. A belt 16, leading from any power-driven pulley, supplies the motive force for rotating wheel 13. The smaller or take-up wheel 17 is mounted upon a shaft 18 supported within the bracket arm 19, as shown best in Fig. 2. A slidable shaft 20 extends through a sleeve 21 carried by the supporting bracket 22, and at its rear end the shaft 20 is provided with a stop 23. A spring 24 extends about shaft 20 and lies between the sleeve 21 and stop 23. Spring 24 normally urges shaft 20 toward stop 23 and thus causes the grooved wheel 17 to maintain the element 10 under tension irrespective of its extension or contraction through varying heat conditions.

To supply current to the element 10, I provide a rotatably-mounted disk or wheel 25 having a V-groove receiving the element 10. A similar disk 26 is supported on the opposite side of the structure, as illustrated in Fig. 1. The contact wheels or disks, which are preferably formed of brass or other good electrical conducting material, are in turn contacted by the spring contacts 27 and 28 respectively, which slide over the contact wheel hubs. Such spring contacts may also be formed of brass or other suitable conducting material. The spring contacts 27 and 28 are connected by the lead wires 29 and 30 respectively to a current regulating instrument 31 connected to a suitable source of electric current.

A table or supporting apron 32 is provided for guiding the thermoplastic material which is to be brought against the moving element 10 in the severing or fusing operation. The table is shown provided with a slot 33 through which element 10 extends.

In the treatment of thermoplastic materials, there is a tendency for melted portions to cling to the element 10, and such material clinging about the wire 10 renders it less effective in the further severing or fusing steps. Further, the material sometimes modifies the position of the element 10 within the groove tracks of the wheels and produces arcing and other undesirable effects. In the illustration given in Fig. 1, I provide a furnace 34 provided with an outer insulation casing 35 and with an inner chamber 36 through which the element 10 extends. Within the chamber 36 and about the element 10, I provide electric-resistance coils 37 to which current is supplied through leads 38 and 39. These leads extend to a current regulating instrument 40 connected with a suitable source of current.

The structure shown is effective in the treatment of any thermoplastic material, such as, for example, polyvinylidene chloride, polyethylene, polyamides, polystyrene, cellulose acetate, cellulose acetate butyrate, copolymers, such as vinyl chloride, vinyl acetate, vinylidene chloride, etc., and as described more fully in my co-pending application Serial No. 709,499 for Preparation of Piled Webs.

*Operation*

In the operation of the structure shown in Figs. 1 and 2, current is supplied through lead 29, contact spring 27, contact wheel 25, to the electric-resistance wire 10. The current passes through the wire 10 to the opposite contact disk 26 and thence backwardly through the spring 28 and lead 30 to the control instrument 31. A sufficient current is supplied to raise the temperature of the element 10 to a severing or fusing temperature. Such temperature will vary depending upon the melting point of the thermoplastic being treated.

Thermoplastic material to be severed or fused is supported upon the table 32 and moved against the traveling wire 10 to effect the desired severing or fusing operation. It will be understood that there is a correlation between the speed of wire 10 and the temperature thereof so that effective severing or fusing may be accomplished at a desired wire speed.

The wire speed is of importance in connection with the freeing of any thermoplastic material clinging to the wire, and such speed is preferably correlated with the temperature of the furnace resistance elements 37. Here, the temperature is higher and produces an oxidation or charring of the material on the wire. The charred material drops off the wire and thus does not interfere with the operation thereof in further severing or fusing steps.

While I have shown a furnace 34 which employs an electric-resistance element, it will be understood that any heating means may be employed. Induction heating is highly effective for the purpose of the invention. Gas flames or any other heating means may be used.

As the element 10 is heated in the starting up of the apparatus, it lengthens, and the force of spring 24 draws the take-up wheel 17 inwardly to thus maintain the element 10 in a taut condition around the V-grooved wheels. The V-grooved wheels are preferably formed of electrical non-conducting material when used with an electric-resistance wire. When the wire 10 is not an electric-resistance wire and the same is heated by other means, the wheels may be formed of metal or any other suitable material.

It will be understood that the table 32 may be tilted to any desired position, and also that the resistance wire and its supporting devices may also be tilted to any desired position with respect to the table. In the illustration given in Fig. 3, the table 32 is tilted away from the 90° angle shown in Fig. 1. In the illustration given in Fig. 4, the resistance element 10 and its supporting wheels form a structure which is tilted as a whole with respect to the table 32ª. The table 32ª is provided with a slot 33ª for receiving the now inclined element 10ª.

Tilting of the table or, in the alternative, tilting of the severing element with respect to the table, results in providing a structure resembling a fur pelt when filaments are advanced along the table and against the element. In other words, the filaments emerge from the base film or web at an angle, as in the case of many fur pelts.

Referring to Figure 4, the structure here shown differs from the structure shown in Fig. 1, not only with respect to the tilting of the elements 10ª and its supporting means in the slotted table 32ª, but also with respect to the means for heating the element 10ª. In the structure shown in Fig. 4, the element 10ª is not an electric-resistance element and it is not heated by an electric current. Instead, the element 10ª is a simple metal wire, such as steel, and the same is heated to a high temperature in the furnace 41. The furnace 41 is heated similarly to furnace 34, but it will be understood that any means for heating the same may be used. The furnace 41 serves two purposes. It supplies sufficient heat for charring and thus removing the plastic material clinging to the wire 10ª and, in addition, it heats the wire 10ª sufficiently so that when the same is passed about the wheels 13, 17 and 11 and has again reached the table 32ª, the temperature of the wire is the desired temperature for the severing or fusing operation. In other words, the temperature of the furnace 41 is correlated with the speed of the wire so that after the charring operation, the wire 10ª cools sufficiently to have just the temperature desired for severing and fusing when it reaches the table 32ª. I have found that excellent results are obtained by using two or more of the furnaces 41, the furnaces being placed as needed about the wire 10ª. By the use of a plurality of furnaces, an exact and nice control of heat can be produced so that there is present, on the one side, a cindering or charring temperature effective for the removing of the thermoplastic material on the wire, and on the other side of the table 32ª the wire 10ª has the lower temperature which is effective and desired for the severing or fusing operation. While a plurality of furnaces are useful, I find, however, that a single furnace may be employed to bring about the two different temperatures desired and the furnace may be located at any suitable point. By correlating the temperature of the furnace and the speed of the wire, the two desired temperatures, namely that for charring the material on the wire and that desired for the wire just above the table 32ª where it meets the thermoplastic material, can be obtained.

In the structure shown in Fig. 5, all of the parts are identical with those shown in Fig. 1 except that the contact disks 42 and 43 are located in different relative positions, and the furnace 34 is omitted. By placing the contact wheels 42 and 43 close together as indicated, the portion of the wire extending around the wheel 17 and between contact wheels 42 and 43 is heated to a much higher temperature than the portion of the wire 10 extending between the contacts and about wheels 11 and 13. Since the temperature of the wire band 10 comprehended in each of the two respective circuits or segments described will be inversely proportional to the length of each segment, by a proper positioning of the contact wheels 42 and 43, the temperature of each segment or portion may be raised or lowered to provide a wire temperature for any selected area. For example, with the arrangement illustrated in Fig. 5, the temperature of the entire portion of the wire 10 between contacts 42 and 43 and extending about wheels 11 and 13 may be held at a lower point which is effective for severing or fusing, while the temperature of the section of the wire between contacts 42 and 43 and extending about take-up wheel 17 may be raised to a cindering or charring temperature.

It is not intended herein to attempt to set out the great variety of means whereby a severing element of the character illustrated may be heated to fusing or severing temperatures and also at least in one area to a charring temperature, because such means are well known to those skilled in the art and may be varied widely to meet varying needs.

It will be understood that the apparatus may be equipped with any desired number of wheels for supporting the severing or fusing element. For example, instead of three wheels, as shown in the drawing, the element may be supported by two wheels, one of which is spring-urged upon its support to serve as a take-up wheel. Other similar modifications will be obvious.

While in the foregoing description, I have set forth specific structures in considerable detail for the purpose of illustrating embodiments of the invention, it will be understood that such details may be varied widely by those skilled in the art without departing from the spirit of my invention.

I claim:

1. A severing machine, comprising a frame, anti-friction means supported therein, a continuous wire loop of electric resistance material supported by said anti-friction means, means for continuously advancing said wire in one direction, contact means engaging said wire at spaced points for supplying an electric current thereto to heat the same through the resistance of the wire, said contact means forming with said wire loop a plurality of electric circuits, means for varying the magnitude of the current flowing in the wire between said contacts, and a platform for supporting material to be severed against said wire.

2. A severing machine, comprising a frame, anti-friction means supported therein, a continuous wire loop of electric resistance material supported by said anti-friction means, means for continuously advancing said wire in one direction, contact means engaging said wire at spaced points for supplying an electric current thereto to heat the same through the resistance of the wire, said contact means forming with said wire loop a plurality of electric circuits, a platform for supporting material to be severed against said wire, and a spring-urged take-up wheel engaging said wire to maintain the wire taut even when expanded under heat.

3. A severing machine, comprising a platform adapted to support material to be severed, a frame, anti-friction members carried by said frame, a continuous wire element of electric resistance material supported by said anti-friction means, means for continuously advancing the wire element in one direction, a wheel engageable with said wire, spring means normally urging said wheel outwardly to maintain said wire taut, contact means adapted to be brought into engagement with said wire at different spaced points thereon to provide a plurality of electric circuits therewith whereby said wire is maintained at a higher temperature at certain points than at others, and means for varying the magnitude of current flowing in said electric circuits.

4. A severing machine comprising a platform provided with a slot, a frame, a plurality of spaced wheels having V-grooves therein, a continuous wire element received within said V-grooves and forming a loop, means for rotating one of said wheels to advance said wire, spring means associated with one of said wheels and drawing the same outwardly to maintain said wire under tension, at least two contact rollers engaging said wire at spaced points thereof for supplying electric current thereto to heat the same through the resistance of the wire and to provide therewith a plurality of electric circuits, contact members engaging said rollers for supplying current thereto and through said rollers to said wire, and means for varying the magnitude of electric current supplied to said wire loop.

5. A severing machine comprising a platform provided with a slot, a frame, a plurality of spaced wheels having V-grooves therein, a continuous wire element received within said V-grooves and forming a loop, means for rotating one of said wheels continuously to advance said wire, spring means associated with one of said wheels and drawing the same outwardly to maintain said wire under tension, at least two contact rollers engaging said wire at spaced points thereof for supplying electric current thereto to heat the same through the resistance of the wire and to provide therewith a plurality of electric circuits, and contact members engaging said rollers for supplying current thereto and through said rollers to said wire, at least two of said contact rollers being spaced closely enough together to provide a material-severing temperature in the shortest portion of the wire lying between said rollers.

6. A severing machine, comprising a frame, an electric resistance wire loop supported in said frame for continuous peripheral movement, contacts engaging said wire at points spaced from each other to provide a plurality of electric circuits with said wire, means for moving said wire in a peripheral direction, means for supporting material to be severed in contact with said wire at one point, and supplemental heating means for subjecting said wire after contact with said material to a charring temperature.

7. A machine for cutting thermoplastic materials, comprising a frame, an electrical resistance wire loop supported in said frame for continuous peripheral movement, means for supporting material to be severed in contact with said wire in one zone, an electrical contact engaging said wire at a point on one side of said zone, a second electrical contact engaging said wire on the opposite side of said zone, means for moving said wire continuously in a peripheral direction, and means for supplying electric current to said contacts operative to heat the wire in said zone to a material-severing temperature when it is not in contact with the material.

8. A machine for cutting thermoplastic materials, comprising a frame, an electrical resistance wire mounted on said frame and adapted for longitudinal movement through a cutting zone, support means adapted to support in and adjacent said cutting zone thermoplastic to be severed by said wire, an electrical contact engaging said wire on one side of said cutting zone, a second electrical contact engaging said wire on the other side of said cutting zone, means for supplying to said contact members an electrical current operative to heat the segment of said wire between said contacts, means operative to move said wire longitudinally in one direction at a substantially constant speed, and means for varying the magnitude of current flowing in said wire within said cutting zone whereby the temperature of the wire in said zone when out of contact with the plastic material may be set at any predetermined value within wide limits.

HYMAN GAIBEL.

REFERENCES CITED

The following references are of record in the file of this patent:

UNITED STATES PATENTS

| Number | Name | Date |
|---|---|---|
| 358,323 | Ballew | Feb. 22, 1887 |
| 1,438,540 | McKenna | Dec. 12, 1922 |
| 1,879,145 | Erickson | Sept. 27, 1932 |
| 2,035,138 | Maxfield | Mar. 24, 1936 |
| 2,064,589 | Convers | Dec. 15, 1936 |
| 2,242,645 | Frost | May 20, 1941 |
| 2,288,980 | Turin | July 7, 1942 |
| 2,386,409 | Saffady | Oct. 9, 1945 |
| 2,430,496 | Dodge | Nov. 11, 1947 |
| 2,432,868 | Earl et al. | Dec. 16, 1947 |
| 2,438,156 | Dodge | Mar. 23, 1948 |
| 2,453,019 | King | Nov. 2, 1948 |

FOREIGN PATENTS

| Number | Country | Date |
|---|---|---|
| 345,941 | Great Britain | Mar. 24, 1931 |
| 147,350 | Austria | May 15, 1936 |